United States Patent
Martin et al.

(10) Patent No.: US 9,720,097 B2
(45) Date of Patent: *Aug. 1, 2017

(54) MULTI-ANTENNA RADIO-NAVIGATION SIGNALS RECEPTION DEVICE

(71) Applicant: THALES, Neuilly-sur-Seine (FR)

(72) Inventors: Nicolas Martin, Bourg les Valence (FR); Vincent Chopard, Tournon sur Rhone (FR); David Depraz, Valence (FR)

(73) Assignee: Thales, Courbevoie (FR)

( * ) Notice: Subject to any disclaimer, the term of this patent is extended or adjusted under 35 U.S.C. 154(b) by 927 days.

This patent is subject to a terminal disclaimer.

(21) Appl. No.: 13/847,416

(22) Filed: Mar. 19, 2013

(65) Prior Publication Data
US 2014/0091966 A1  Apr. 3, 2014

(30) Foreign Application Priority Data
Mar. 22, 2012  (FR) ...................................... 12 00854

(51) Int. Cl.
*G01S 19/29*  (2010.01)
*G01S 19/14*  (2010.01)
*G01S 19/24*  (2010.01)
*G01S 19/35*  (2010.01)

(52) U.S. Cl.
CPC .............. *G01S 19/29* (2013.01); *G01S 19/14* (2013.01); *G01S 19/24* (2013.01); *G01S 19/35* (2013.01)

(58) Field of Classification Search
CPC ........... G01S 19/29; G01S 19/36; G01S 19/33
USPC .................................................. 342/357.68
See application file for complete search history.

(56) References Cited

U.S. PATENT DOCUMENTS

| | | | | |
|---|---|---|---|---|
| 4,406,017 A | * | 9/1983 | Takahashi | H04B 7/084 455/137 |
| 5,923,287 A | * | 7/1999 | Lennen | G01S 19/33 342/357.73 |
| 2002/0033766 A1 | | 3/2002 | Pratt | |
| 2002/0044085 A1 | | 4/2002 | Howell | |
| 2009/0066574 A1 | * | 3/2009 | De Lorenzo | G01S 19/21 342/357.59 |
| 2009/0121932 A1 | * | 5/2009 | Whitehead | A01B 69/008 342/357.36 |
| 2009/0135060 A1 | | 5/2009 | Lennen | |
| 2010/0007555 A1 | * | 1/2010 | Ezal | G01C 21/005 342/357.3 |

(Continued)

OTHER PUBLICATIONS

Patrick C. Fenton et al.; Using GPS for Position and Attitude Determination of the Canadian Space Agency's Active Rocket Mission; Sep. 15, 1998; Nashville, Tennessee USA.

*Primary Examiner* — Tashiana Adams
*Assistant Examiner* — Helena Seraydaryan
(74) *Attorney, Agent, or Firm* — Davis Wright Tremaine LLP; Michael J. Donohue

(57) ABSTRACT

The invention relates to a device for receiving satellite radio-navigation signals comprising a plurality of receiving antennas forming an antenna array. The invention consists in using a plurality of antennas disposed around the circumference of a carrier and in demodulating the signals received by each antenna separately. The diversity of the demodulation chains is utilized to compensate the signal loss on one of the chains when the corresponding antenna experiences a signal loss due to the masking of the satellite by the carrier.

7 Claims, 2 Drawing Sheets

(56) References Cited

U.S. PATENT DOCUMENTS

2012/0050103 A1\* 3/2012 Revol ................. G01S 19/21
                                                    342/357.68
2012/0108193 A1\* 5/2012 Small ....................... 455/269

\* cited by examiner

MULTI-ANTENNA RADIO-NAVIGATION SIGNALS RECEPTION DEVICE

FIELD OF THE INVENTION

The subject of the present invention is a multi-antenna radio-navigation signals receiving device.

The field of the invention is that of satellite radio-navigation systems known by the acronym GNSS ("Global Navigation Satellite System") systems such as the GPS or GALILEO systems.

More precisely, the invention relates to radio-navigation signals receivers comprising several receiving antennas.

BACKGROUND OF THE INVENTION

A GNSS receiver can be used on any type of vehicle to determine information about its position, its speed and generally to provide an aid to movement or to navigation.

In particular, such a receiver can be used on a space launcher. The use of a mono-antenna receiver in such a case of application poses a problem since the vertical position of the fuselage of the craft gives rise to a masking of a part of the satellites in view by the body of the launcher for the antennas. The signals transmitted by these satellites will then not be received or be received with a strong attenuation by the receiver. In a more general manner, the positioning of an antenna on the body of a carrier of large wingspan poses the problem of the masking of all or part of the radio-navigation signals emitted by the satellites in view of the carrier by the carrier itself.

A solution making it possible to solve the problem of signals masking consists in using an annular antenna disposed around the circumference of the fuselage of the carrier. In this manner, the signal emitted by a satellite is permanently received by at least one part of the antenna. However, this type of antenna does not make it possible to achieve satisfactory performance since it produces a single signal output which is constructed in a non-optimal manner and which gives rise to significant losses in signal-to-noise ratio.

The invention makes it possible to solve the aforementioned problem by proposing a solution which improves performance with respect to the known receivers. The invention consists in using a plurality of antennas disposed around the circumference of the fuselage of the craft and in demodulating the signals received by each antenna separately. The diversity of the demodulation chains is utilized to compensate the signal loss on one of the chains when the corresponding antenna experiences a signal loss due to the masking of the satellite by the carrier.

SUMMARY OF THE INVENTION

The subject of the invention is a device for receiving satellite radio-navigation signals comprising a plurality of receiving antennas forming an antenna array, for each antenna and for each satellite in view of the said device, a reception chain comprising means for demodulating the signals received, a code loop and a carrier loop, the said demodulation means comprising means for phase-wise multiplication with a local carrier, means for time-wise correlation with a local code and means for integrating the correlated signal in phase and in time, the carrier loop comprising a phase discriminator, a carrier loop corrector and a numerical control operator NCO able to deliver a local carrier phase, the code loop comprising a code discriminator, a loop corrector and a numerical control operator NCO able to deliver a measurement of the instant of emission by the satellite of the signal received, characterized in that:

each reception chain of the said device furthermore comprises interconnection means suitable for simultaneously toggling the inputs of the numerical control operator NCO of the carrier loop and of the numerical control operator NCO of the code loop of a first reception chain to the outputs of the carrier loop corrector and of the code loop corrector of a second reception chain when the signal transmitted by the satellite is no longer received by the antenna of the first reception chain so that the first reception chain operates in open loop, the said device furthermore comprises means for selecting the measurement, from among those delivered by each reception chain operating in closed loop, which exhibits the highest signal-to-noise ratio or which arises from the processing chain which exhibits the highest antenna gain in reception.

According to a particular aspect of the invention, the receiving antennas are positioned around the circumference of a carrier of substantially cylindrical shape.

According to another particular aspect of the invention, the signal loss on an antenna due to the masking of the signal by the body of the carrier is anticipated as a function of the respective positions of the carrier, of the antennas and of the satellites.

In a variant embodiment, the device according to the invention furthermore comprises, for each reception chain, a corrector of the lever arm which consists in compensating each measurement of the instant of emission by the satellite of the signal received by the optical path difference $\Delta L_{BL}$ between the phase centre of the antenna and the centre of symmetry O of the antenna array.

In a variant embodiment of the invention, each reception chain furthermore comprises, for the code loop and the carrier loop, a speed-wise lever arm corrector which consists in compensating the outputs of the loop correctors by the temporal derivative of the optical path difference $\Delta L_{BL}$.

In a variant embodiment of the invention, the optical path difference $\Delta L_{BL}$ is determined by projecting the lever arm r onto the view axis between the centre of symmetry O of the antenna array and the satellite.

In a variant embodiment of the invention, the coordinates of the lever arm r are determined, in a spatial reference frame fixed with respect to the earth, on the basis of a measurement of the attitude of the carrier.

BRIEF DESCRIPTION OF THE DRAWINGS

Other characteristics and advantages of the present invention will be more apparent on reading the description which follows in conjunction with the appended drawings which represent.

MORE DETAILED DESCRIPTION

Figure 1A:
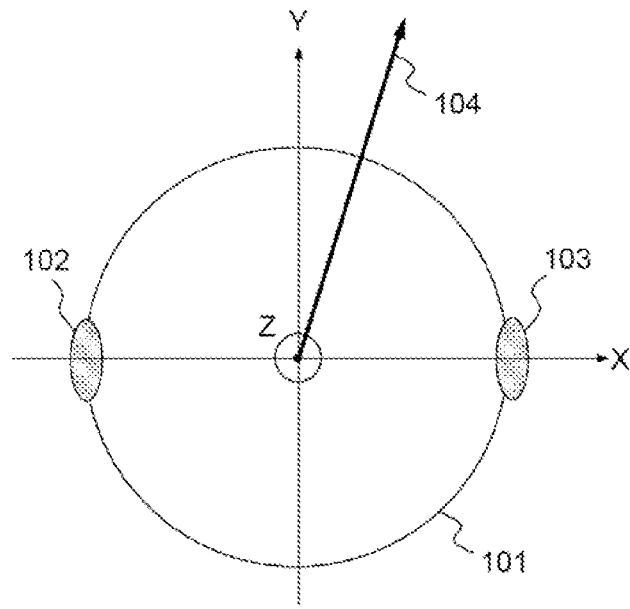
FIG. 1a, a diagram viewed from above and in transverse section of the disposition of the antennas of a receiver according to the invention on the body of a carrier of space launcher type, in an embodiment comprising only two antennas, FIG. 1b, an illustration of the problem of the masking of a satellite by the body of the carrier, FIG. 2, a diagram of the functional architecture of a receiver according to the invention comprising two antennas.

FIG. 1a shows diagrammatically, viewed from above and in transverse section, a carrier 101 of substantially cylindrical shape with two receiving antennas 102, 103 positioned around the circumference of the body of the carrier, for example in an equidistributed manner. The axis 104 represents the view axis between the GNSS receiver according to the invention, positioned on the carrier 101, and a radio-navigation satellite. The axis 104 corresponds to the direction of reception of the radio-navigation signal emitted by a satellite. According to the orientation of the view axis 104, the signal received by an antenna 102, 103 may be partially or totally masked by the body of the carrier 101.

FIG. 1a represents an exemplary embodiment of the receiver according to the invention comprising two antennas, but an arbitrary number, greater than or equal to two, of antennas is also conceivable. The antennas are disposed preferably around the circumference of the carrier in an equidistributed manner. More generally the antennas are arranged on the body of the carrier so that at each instant, at least one satellite must be in view of at least one antenna without the entirety of the signals received being masked by the body of the carrier.

Figure 1B:
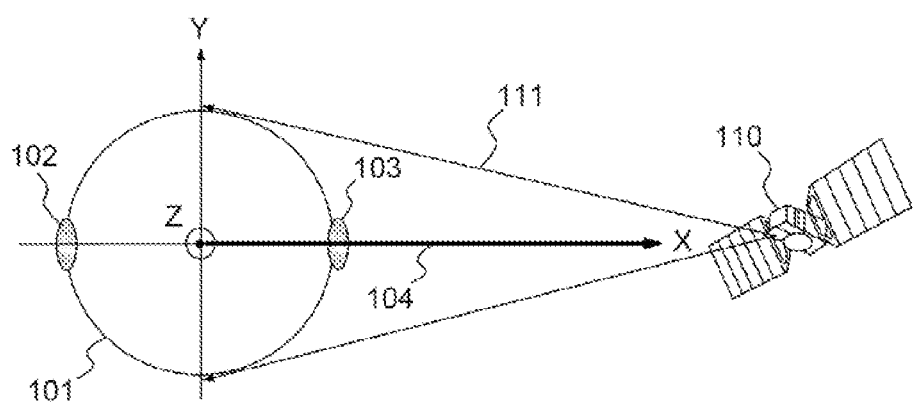

FIG. 1b illustrates a case of masking of a radio-navigation signal 111 emitted by a satellite 110. The signal 111 is correctly received by the antenna 103 disposed in view of the satellite but is not received by the second antenna 102, since it is masked by the carrier 101.

Figure 2:
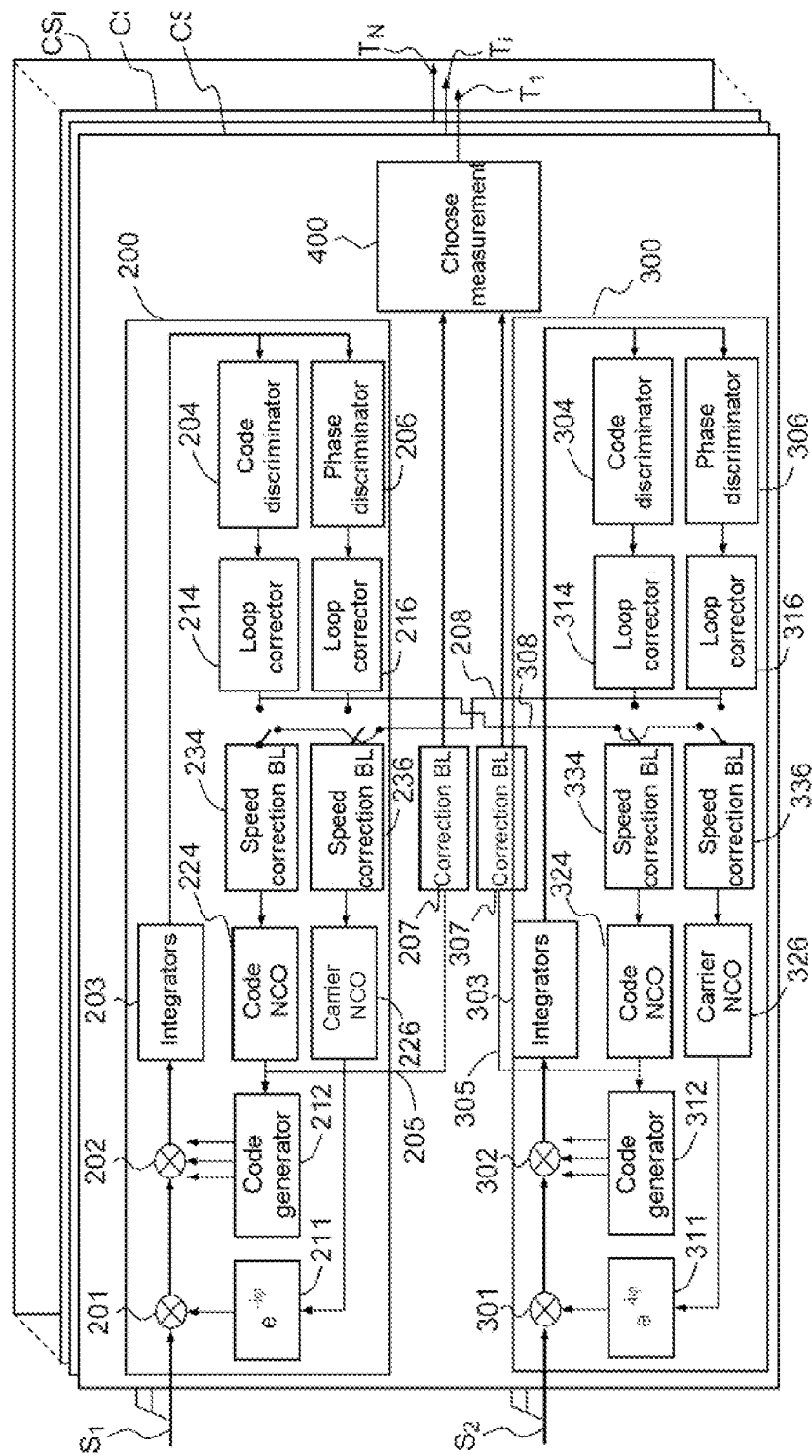

FIG. 2 illustrates on a diagram the functional architecture of a receiver of radio-navigation signals according to the invention comprising two antennas (not represented).

Such a receiver comprises several reception pathways $CS_1, CS_i, \ldots, CS_N$ for each satellite channel, N being equal to the number of radio-navigation satellites in view of the receiver.

The processings implemented for one reception pathway $CS_1$ are now described; these processings are duplicated for each of the other reception pathways.

A reception pathway 200, 300 is applied for each signal $S_1, S_2$ received by each of the two antennas. The signal received $S_1, S_2$ is demodulated in phase by multiplication 201, 301 with a local carrier 211, 311 and is despread by correlation 202, 302 with a local code 212, 312.

The local carrier 211,311 and the local code 212,312 are generated locally.

The demodulated and despread signal is thereafter integrated by coherent-integration means 203, 303. The set consisting of the phase-wise multiplier 201,301 of the code-wise multiplier 202,302 and of the integration means 203, 303 carries out a correlation in phase and code of the signal received with the local carrier and the local code.

To synchronize the local code and the local carrier the radio-navigation signal emitted by the satellite and received by the antenna, the receiver uses in parallel two tracking devices, namely a code loop and a carrier loop.

The code loop serves to position a local code in phase with the code contained in the satellite signal $S_1, S_2$ received, so as to carry out a correlation giving the maximum of energy.

The carrier loop serves to slave the frequency or the phase of the local carrier with respectively the frequency or the phase of the carrier received, in order to maximize the result of the correlation.

The presence of a signal as integration output 203, 303 with a significant amplitude, that is to say markedly greater than would be given by the ambient noise in the absence of signal received signifies that the local code and the local carrier are synchronized to the signal received, thereby making it possible to measure at each instant the instant of emission and the Doppler frequency of the signal received, by way of the phase of the local code and of the speed of the phase of the local carrier.

The code loop comprises a code discriminator 204, 304 which delivers, on the basis of the integrated correlated signal, an item of information about the temporal shift between the code of the signal received and the local code, a loop-correcting filter 214, 314 which produces, on the basis of the output of the code discriminator 204, 304, a correction in speed and a numerical control operator 224, 324, also called NCO, which transforms the speed command into a time command which drives the generation of the local code 212, 312. On the basis of the time command provided at the output of the numerical control operator 224, 324, an estimate 205, 305 of the instant of emission of the signal by the satellite is produced.

The carrier loop serves to slave the phase of the local carrier to the phase of the carrier received to within modulo $2\pi$ with the aim of improving the precision of the code measurement by virtue of a smoothing of the code by the phase of the carrier.

A carrier loop, also called PLL, signifying Phase Lock Loop, uses the punctual correlation pathway and slaves the phase of the local carrier to the phase of the carrier received by a feedback on the local phase. The carrier loop comprises a phase discriminator 206, 306 which measures the deviation between the local phase and the phase received, a loop corrector 216, 316 which filters the output of the phase discriminator 206, 306 and produces a speed correction, a carrier NCO numerical control operator 226, 326 which transforms the speed command into a local carrier phase which drives the carrier generator 211,311.

Without departing from the scope of the invention, the carrier loop can also be embodied by a frequency lock loop.

In a variant embodiment of the invention, each mono-antenna demodulation pathway furthermore comprises a correction of the lever arm 207, 307 between the centre of symmetry O of the antenna array and the phase centre of the antenna. The coordinates of the lever arm r are calculated in a spatial reference frame fixed with respect to the earth, such as the known ECEF ("Earth Centred Earth Fixed") reference frame. The coordinates of the antennas in an ECEF reference frame are obtained by virtue of a matrix for changing reference frame, provided either by a system for determining the attitude of the carrier external to the invention or by an attitude determination processing carried out directly on the basis of the measurements of the signals received on the various antennas.

The lever arm r obtained is thereafter projected onto the view axis 104 to obtain the optical path difference $\Delta L_{BS}$ between the centre of symmetry O of the antenna array and the phase centre of the antenna. The correction of the lever arm 207, 307 consists in compensating the temporal measurement 205, 305 provided by each reception chain 200, 300 by this optical path difference $\Delta L_{BS}$.

The correction of the lever arm on the measurements arising from each antenna makes it possible to render them comparable by correcting the temporal shift induced by the distance between each antenna. The temporal estimates 205, 305 are thereafter transmitted to a decision module 400 which selects the estimate $T_1$, from among those available, which corresponds to the best signal-to-noise ratio of the signal received or to the best antenna gain in reception.

In another variant embodiment of the invention, the code loop and the carrier loop furthermore each comprise a speed-wise lever arm corrector 234, 236, 334, 336. The speed-wise lever arm correction consists in calculating the derivative of the optical path difference $\Delta L_{BS}$ with respect to time and in compensating the outputs of the code loop correctors 214, 314 and of the carrier loop correctors 216, 316 by this derivative.

The operation of the receiver according to the invention is now described in greater detail.

When the satellite signal $S_1$, $S_2$ is received by the two antennas, each demodulation pathway is implemented independently and provides an independent measurement 205, 305 of the instant of emission of the signal by the satellite. A choice is thereafter made by a decision module 400.

When an antenna no longer receives any signal originating from a satellite, since the view axis between this antenna and the satellite is masked by the body of the carrier 101, the operation of the code and carrier loops is affected thereby since there is a risk of dropout of the loops. To avoid this problem, the invention consists in toggling the reception pathway affected by a loss of signal to open loop and in driving the code NCO and carrier NCO by the code and carrier speed corrections provided by the reception pathway of another antenna. When the signal is again received by the antenna, the open loop is closed and thus the signal locked onto directly without inducing discontinuities in the operation of the loops. The temporal measurement 205, 305 provided by the reception pathway operating in open loop is excluded from the choice made by the decision module 400.

The principle described hereinabove is illustrated in FIG. 2 by the connectors 208, 308 which make it possible to link the outputs of the loop correctors of one chain to the inputs of the speed-wise lever arm correctors of another chain or directly to the inputs of the code NCO and carrier NCO when the lever arms are not corrected.

The coordinates of the carrier in a terrestrial reference frame as well as the positions of the satellites are assumed known, thus it is possible to anticipate a loss of signal originating from a satellite on a given antenna if the associated view axis is masked by the carrier and thus determine beforehand the instant of toggling of a reception pathway to open loop or to closed loop.

The invention extends to receivers comprising more than two antennas.

The invention claimed is:
1. Device for receiving satellite radio-navigation signals comprising:
   a plurality of receiving antennas forming an antenna array, for each antenna and for each satellite in view of the said device, a reception chain comprising:
   a demodulator for demodulating the signals received, the demodulator comprising a multiplier for phase-wise multiplication with a local carrier;
   a correlator for time-wise correlation with a local code;
   an integrator for integrating the correlated signal in phase and in time;
   a carrier loop comprising a phase discriminator, a carrier loop corrector and a carrier numerical control operator NCO able to deliver a local carrier phase;
   a code loop comprising a code discriminator, a code loop corrector and a code numerical control operator NCO able to deliver a measurement of an instant of emission, by the satellite, of the received signal;
   a first reception chain having an input of the carrier numerical control operator NCO in the first chain coupled to an output of the carrier loop corrector in the first chain and an input of the code numerical control operator NCO in the first chain coupled to an output of the code loop corrector in the first chain so the first chain operates in a closed loop when the antenna in the first chain is receiving satellite signals;
   the first chain having the input of the carrier numerical control operator NCO in the first chain coupled to an output of the carrier loop corrector in a second reception chain and the input of the code numerical control operator NCO in the first chain coupled to an output of the code loop corrector in the second chain so the first chain operates in an open loop when the antenna in the first chain is not receiving satellite signals;
   the said device further comprising a selector for selecting a measurement of the instant of emission of the received signal, from the measurements delivered by each reception chain operating in closed loop, which exhibits a highest signal-to-noise ratio or which arises from the reception chain which exhibits a highest antenna gain in reception.

2. Device for receiving radio-navigation signals according to claim 1, wherein the receiving antennas are positioned around the circumference of a carrier of substantially cylindrical shape.

3. Device for receiving radio-navigation signals according to claim 1, wherein a signal loss on an antenna due to a masking of the signal by the body of the carrier is anticipated as a function of the respective positions of the carrier, of the antennas and of the satellites.

4. Device for receiving radio-navigation signals according to claim 1, furthermore comprising, for each reception chain, a lever arm corrector configured for compensating each measurement of the instant of emission of the received signal with an optical path difference $\Delta L_{BL}$ between the phase centre of the antenna and the centre of symmetry O of the antenna array.

5. Device for receiving radio-navigation signals according to claim 1, wherein each reception chain furthermore comprises, for the code loop and the carrier loop, a speed-wise lever arm corrector which consists in compensating the outputs of the loop correctors by a temporal derivative of an optical path difference $\Delta L_{BL}$.

6. Device for receiving radio-navigation signals according to claim 4, wherein an optical path difference $\Delta L_{BL}$ is determined by projecting a lever arm r onto a view axis between the centre of symmetry O of the antenna array and the satellite.

7. Device for receiving radio-navigation signals according to claim 6, wherein the coordinates of a lever arm r are determined, in a spatial reference frame fixed with respect to the earth, on the basis of a measurement of the attitude of the carrier.

* * * * *